C. F. TAYLOR.
TAIL LIGHT HANGER.
APPLICATION FILED JUNE 5, 1918.
1,294,968.
Patented Feb. 18, 1919.
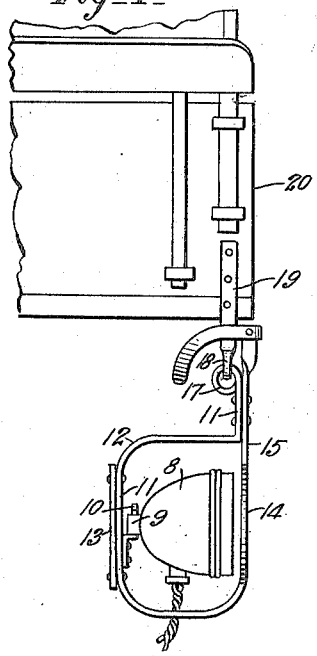
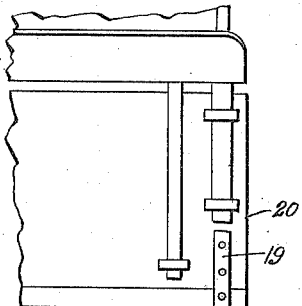
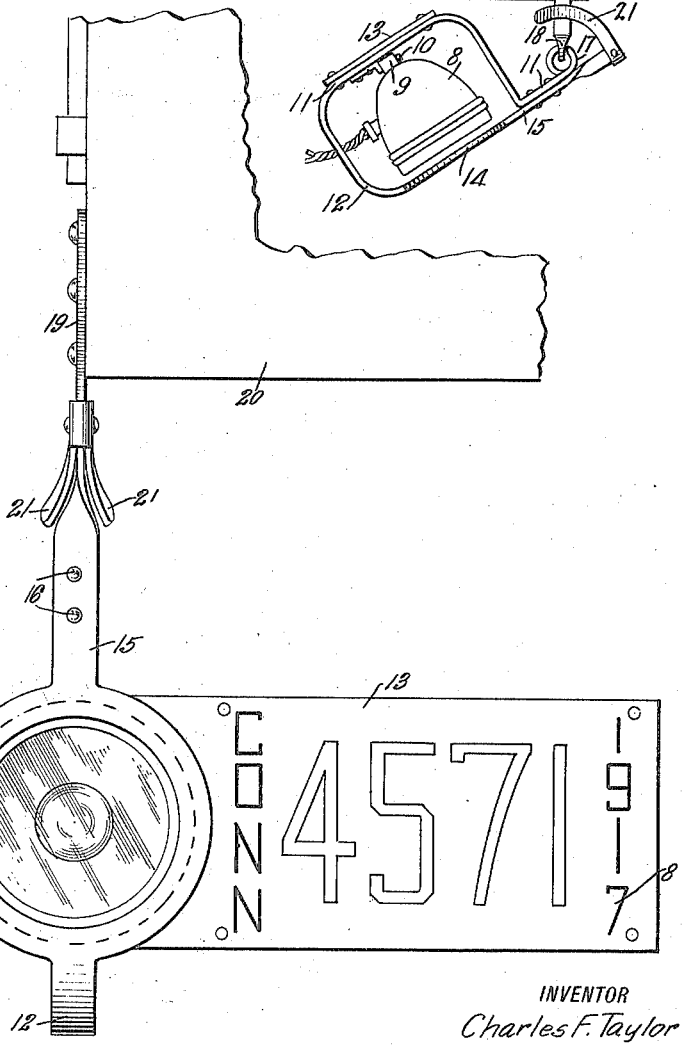
WITNESSES
Frank C. Palmer
INVENTOR
Charles F. Taylor
BY
ATTORNEYS

UNITED STATES PATENT OFFICE.

CHARLES F. TAYLOR, OF NEW YORK, N. Y.

TAIL-LIGHT HANGER.

1,294,968.  Specification of Letters Patent.  Patented Feb. 18, 1919.

Application filed June 5, 1918. Serial No. 238,326.

*To all whom it may concern:*

Be it known that I, CHARLES F. TAYLOR, a citizen of the United States, and a resident of the city of New York, borough of Manhattan, in the county and State of New York, have invented a new and Improved Tail-Light Hanger, of which the following is a full, clear, and exact description.

Among the principal objects which the present invention has in view are: to avoid breakage of lamps of the character mentioned when backing a vehicle equipped therewith; to provide means for centering the lamp by guiding it to its service position; and to provide a yielding support for lamps of the character mentioned having means for associating a license plate therewith at all times.

Drawings.

Figure 1 is a side view of a hanger constructed and arranged in accordance with the present invention, showing a lamp and a rear fragment of a vehicle truck equipped with the lamp;

Fig. 2 is a similar view showing the hanger and parts carried thereby in retracted position;

Fig. 3 is a face view of the hanger, the view being shown on an enlarged scale and in conjunction with a rear end fragment of a vehicle truck body.

Description.

Heretofore it has been the custom to attach the tail end or ruby light on vehicles permanently and fixedly. As a rule, these lights are associated with license tags or panels so arranged that illuminating rays from the lights are thrown over the face of said panels. Usually the traffic ordinances have as a requirement that the tail light and license tag shall be thus associated to be readily viewed from the rear of the vehicle. The result of this arrangement is that many of these lamps are broken by the vehicle being backed into an obstruction which strikes and crushes the lamp. This is partly due to the fact that in most cases the body of the vehicle overhangs the running gear thereof at the rear and to the fact that the lamp is mounted on the rear end of the body.

As seen in the drawings, an electric lamp 8 having a loop 9 is supported in service by a hook 10 extended from the back bar 11 of a hanger frame 12. The back bar also serves to support a license tag 13. The front of the lamp 8 is protected by an open centered ring 14. The ring 14 is incorporated in the structure of the front bar 15 of the hanger. The front and rear bars of the hanger frame are brought together and fastened by rivets 16 in the shape of an open loop. The extremity of the back bar 11 is curled upon itself to form an eye 17, which hangs in an eye 18 of a strap 19. The strap 19 is made fast to the side of the vehicle body 20, adjacent the rear end thereof. The strap 19 serves the double purpose of supporting the hanger frame and of guiding the same to hold it in an upright position, and also to prevent the lateral swing of the frame. To this end, the extremity of the front bar 15 is provided with forwardly flared curved guide fingers 21. As best seen in Fig. 1 of the drawings, the spread of the ends of said fingers is such as to engage the strap 19 when the hanger is swung to lateral positions when the lamp hanger and parts supported thereby have been swung backward, as shown in Fig. 2 of the drawings.

The fingers 21 converge so that when the hanger is in the vertical position shown in Fig. 1 of the drawings, the said fingers grasp the strap 19 with sufficient force to prevent the hanger from being readily disengaged from the said strap.

Claim.

An apparatus as characterized comprising a hanger frame having a hook for supporting an electric lamp thereon, and a guard member for protecting the lamp when held in said frame; means for pivotally hanging said frame from a vehicle body; and means for guiding said frame to its normal service position.

CHARLES F. TAYLOR.

Copies of this patent may be obtained for five cents each, by addressing the "Commissioner of Patents, Washington, D. C."